United States Patent
Salazar et al.

(10) Patent No.: US 11,857,991 B2
(45) Date of Patent: Jan. 2, 2024

(54) PLASTIC SCRUBBER FOR PAINT SPRAY BOOTH

(71) Applicant: GIFFIN, INC., Auburn Hills, MI (US)

(72) Inventors: Abraham J. Salazar, Lake Orion, MI (US); Steve M. Smith, Ortonville, MI (US); Gregory S. Batchik, Clarkston, MI (US)

(73) Assignee: GIFFIN, INC., Auburn Hills, MI (US)

( * ) Notice: Subject to any disclaimer, the term of this patent is extended or adjusted under 35 U.S.C. 154(b) by 266 days.

(21) Appl. No.: 17/122,141

(22) Filed: Dec. 15, 2020

(65) Prior Publication Data

US 2021/0187537 A1 Jun. 24, 2021

Related U.S. Application Data (60) Provisional application No. 62/950,262, filed on Dec. 19, 2019.

(51) Int. Cl.
| | |
|---|---|
| *B01D 45/16* | (2006.01) |
| *B05B 16/20* | (2018.01) |
| *B01D 47/02* | (2006.01) |
| *B01D 50/40* | (2022.01) |
| *B01D 45/08* | (2006.01) |

(52) U.S. Cl.
CPC ............ *B05B 16/20* (2018.02); *B01D 45/16* (2013.01); *B01D 47/024* (2013.01); *B01D 47/025* (2013.01); *B01D 50/40* (2022.01); *B01D 45/08* (2013.01)

(58) Field of Classification Search
CPC ......... B05B 16/20; B05B 14/43; B05B 14/44; B05B 14/462; B05B 14/468; B05B 16/60; B05B 13/0431; B01D 45/16; B01D 47/024; B01D 47/025; B01D 50/40; B01D 45/08; B01D 2247/10; B01D 47/02; Y02P 70/10

See application file for complete search history.

(56) References Cited

U.S. PATENT DOCUMENTS

| | | | | |
|---|---|---|---|---|
| 4,205,968 A | * | 6/1980 | Hakala | B01D 47/06 |
| | | | | 261/109 |
| 4,289,611 A | * | 9/1981 | Brockmann | B04C 3/06 |
| | | | | 209/710 |
| 5,240,115 A | * | 8/1993 | Crossley | D21D 5/24 |
| | | | | 96/204 |
| 6,024,796 A | * | 2/2000 | Salazar | B05B 14/46 |
| | | | | 96/322 |
| 7,150,773 B1 | * | 12/2006 | Duke | B01D 45/02 |
| | | | | 55/447 |
| 7,785,400 B1 | * | 8/2010 | Worley | B01D 45/12 |
| | | | | 96/155 |
| 8,241,405 B2 | | 8/2012 | Salazar | |
| 9,981,281 B2 | | 5/2018 | Salazar | |
| 10,046,338 B2 | * | 8/2018 | Whitehead | B01D 45/08 |

(Continued)

*Primary Examiner* — Dung H Bui
(74) *Attorney, Agent, or Firm* — DICKINSON WRIGHT PLLC (57) ABSTRACT

A wet scrubber having a body that is molded from a plastic material in combination with a nozzle insert that is removably received in the inlet of the wet scrubber and configured to optimize the speed of fluid flow entering a mixing chamber provided in the wet scrubber. Interchangeable nozzle inserts allow to optimize operation of the wet scrubber for different processes the wet scrubber is operating in conjunction with.

13 Claims, 8 Drawing Sheets

(56) References Cited

U.S. PATENT DOCUMENTS

| | | | | |
|---|---|---|---|---|
| 10,512,863 B2* | 12/2019 | Magnus | ................. | B01D 45/02 |
| 10,857,494 B2 | 12/2020 | Salazar | | |
| 2012/0174544 A1* | 7/2012 | Tornblom | ............... | B04B 5/005 |
| | | | | 55/438 |
| 2013/0327002 A1* | 12/2013 | Ackermann | .............. | B04C 3/00 |
| | | | | 55/327 |
| 2015/0246307 A1* | 9/2015 | Whitehead | ............ | B01D 45/16 |
| | | | | 55/459.4 |
| 2015/0343366 A1* | 12/2015 | Wuebbeling | ........... | B01D 45/12 |
| | | | | 55/346 |
| 2016/0158787 A1* | 6/2016 | Salazar | ................. | B05B 14/43 |
| | | | | 118/323 |
| 2019/0388907 A1* | 12/2019 | Bowley | ................... | B04C 5/103 |
| 2021/0046436 A1* | 2/2021 | Li | .......................... | B01F 23/60 |

\* cited by examiner

PLASTIC SCRUBBER FOR PAINT SPRAY BOOTH

CROSS-REFERENCE TO RELATED APPLICATIONS

This application claims the benefit of priority under 35 U.S.C. § 119 to U.S. Provisional Application No. 62/950,262, filed Dec. 19, 2019, the contents of which are incorporated herein by reference in their entirety.

BACKGROUND

1. Field of the Invention

The present invention generally relates to a wet scrubber for separating and removing oversprayed particles in a paint spray booth. More specifically, the present invention relates to a wet scrubber for such applications that is molded from a plastic material.

2. Description of Related Art

Many industrial processes require the application of a coating or protective layer to an article. For instance, applying a surface coating (e.g., paint) to an object requires application of the coating material (such as a liquid or powder slurry) which is sprayed or otherwise delivered to the article. Typically, this material application will occur in a contained environment that enables control of the material. For example, paint is often applied in a paint spray booth that allows control of the atmospheric conditions and containment of the paint. Inherent in the paint spraying process is overspray, that is, paint that does not adhere to the object being painted which floats in the air as a mist. In order to provide a safe working environment and a high quality finished product, paint spray booths require a substantially continuous supply of clean, fresh air, which also assists with discharge of the overspray from the booth.

Various configurations of spray booths have been developed for different material application processes and handling of the overspray. These booths are often classified by the direction of the airflow in the spraying area. For instance, cross-draft booths have an airflow which moves parallel to the floor from behind the operator (or robotic device) toward a dry filter or a water curtain. Downdraft booths have an airflow which moves from the ceiling vertically downward to an exhaust system below the floor. Semi-downdraft booths include an airflow which moves in a diagonal direction in the booth towards an exhaust.

Since the overspray contains paint particles, it is important to filter or otherwise clean this air before discharging it back into the environment. Several methods have been developed for separating the paint mist from the air exhaust stream. For instance, a dry method results in air entrained with paint being forced through a dry filter or screen which absorbs or otherwise captures the paint particles. A wet method requires the air entrained with paint to contact and be mixed with liquid, such as water, so that the paint particles are captured by the liquid.

Due to the large amount of paint used by some industrial paint facilities, such as those in automotive plants, the wet method in a downdraft booth is the preferred configuration. These booths generally have a wet scrubber that captures the coating overspray and assists with separating the oversprayed particles from the air.

Over time, various configurations of wet scrubbers have been developed in attempts to increase the efficiency of the particle separation and minimize operating costs for the paint facility. For instance, a Venturi type of scrubber utilizes a restriction or Venturi to accelerate the paint laden air, generate turbulence, and break-up the supply water (or the capturing fluid) running along its walls into small drops that capture or trap the paint particles in the exhaust air. Another type consists of an elongated tube with a nozzle positioned at the tube exit, whereby water flows downward along the walls of the tube and into a pool of liquid contained within a capturing chamber, in which turbulence is generated and the paint particles in the air are captured or trapped within the water. Although these designs capture the overspray and separate some of the paint particles, they use a large amount of energy and/or allow a sub-optimal amount of paint particles to penetrate the system and be exhausted to the outside air. More modern scrubber designs utilize vortex chambers to capture and separate paint particles and volutes to decelerate the air flow and recover pressure. Although these designs capture a greater amount of paint particles than the Venturi or tube type wet scrubbers, the volutes permit back flow of the exhaust, creating recirculation that perturbs the vortex flow, thereby decreasing capturing efficiency, taking away energy, reducing the recoverable pressure energy, and reducing the effective flow area, precluding airflow deceleration and precipitation of the water droplets.

In U.S. Pat. No. 8,241,405 (B2) the present applicant describes a wet scrubber that includes (referencing element numbers used in the patent) a conduit 12 having an inlet 14, a mixing chamber 16, a pair of vortex chambers 18, and a pair of exhaust extensions 45. Fluid flow enters the mixing chamber and directs the fluid flow toward an impingement pool so as to trap particles from the airflow into the impingement pool. The airflow is directed into vortex chambers by a divider so that, as described, centrifugal force provides contact between the particles in the air and the water and, therefore, enhancing capturing. Adjustable plates 23a, 23b are provided in the outlet of the conduit 12 to optimize the speed of air entrained with paint that exits the outlet of conduit 12.

The present invention provides a wet scrubber that is formed by a plastic molding process and a nozzle insert for the wet scrubber that allow for quick adjustment of airflow for changes in operating conditions of the overall systems in which the wet scrubber is incorporated in. Moreover, the nozzle insert provides additional benefits related to installation, maintenance and operation of the device.

DESCRIPTION

The plastic molded scrubber of the present invention generally functions in the same manner as the wet scrubber disclosed in U.S. Pat. No. 8,241,405 (B2) issued to the same inventor, the entire disclosure of which patent is hereby expressly incorporated by reference.

Taking the internal shape of the scrubber of the present invention into consideration, it was determined that a rotational molding process could be used to fabricate a structure with a small number of separate components including a main body, a front exhaust extension, and a back exhaust extension. In this process, commonly used for kayak fabrication, the mold is shaped to match the desired exterior shape of the scrubber. The amount of material is calculated to generate a certain wall thickness. The molding material is placed inside the mold and the mold is warmed and rotated until the material is melted and covers as uniformly as possible the interior of the mold. The mold is subsequently cooled. The solidified part is then extracted. The part is typically a fully enclosed shape. The openings, discussed below, for the inlet and outlet in the scrubber are cut after the molding process is completed. Other molding processes may be used to form the scrubber of the present invention.

While the scrubbers of the present invention can be made out of any various plastic materials that are mechanically suitable, preferred materials for a particular use should be able to withstand chemical or solvents that are present in the fluids to be processed. Polyolefin resins are typically used for rotational molding, with thermoplastic polymers of ethylene being most often used. For general purposes it was determined that High Density Polyethylene (HDP) and Low Density Polyethylene (LHP) are particularly suitable for forming the scrubber of the present invention.

Due to the limitations involved in molding a plastic scrubber, nozzle inserts were developed during the course of the present invention to provide for adjustment of airflow that correspond or reflect changes in operating conditions of the overall system in which the scrubbers of the present invention are incorporated in. Details about such a nozzle insert as well as its components and advantages are discussed below.

Use of the scrubber will be described below in reference to a downdraft paint spray booth as disclosed in U.S. Pat. Nos. 8,241,405 (B2) and 9,981,281 (B2), the complete disclosures of which are hereby expressly incorporated by reference, it being noted that the scrubber could be used in other types of paint booths, including semi-downdraft paint booths.

Figure 1:
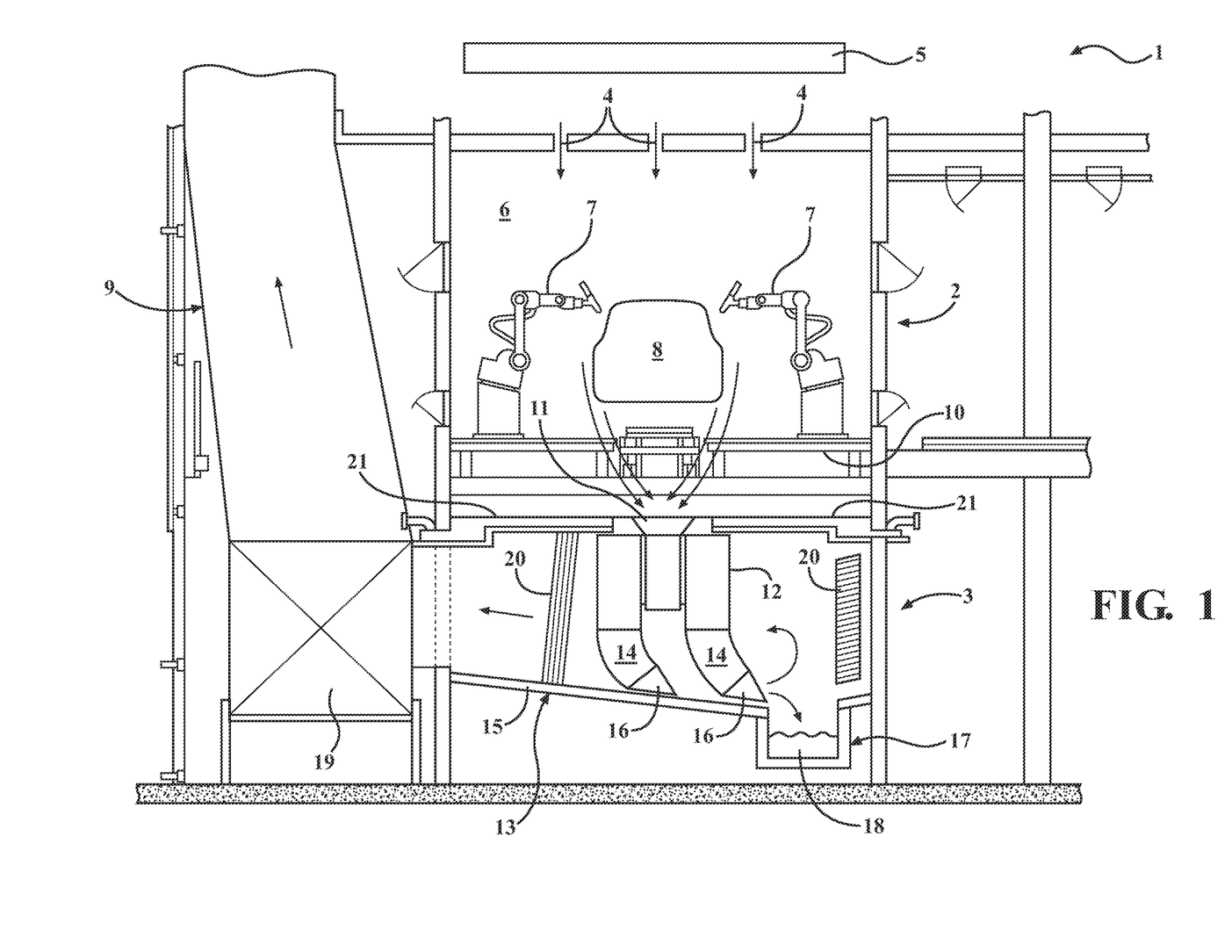
FIG. 1 is a schematic view of a paint spray booth having a wet scrubber assembly incorporating the principles of the present invention.

Typical automotive spray booths are manufactured in modular sections that are repeated lengthwise to create the complete booth. As seen in FIG. 1, a modular paint spray booth 1 includes an upper or spraying section 2 and an under or capturing section 3. The upper section 2 is in fluid communication with an air supply 4, such as conditioned air blown in from outside the booth. Some of this air from the air supply 4 may be directed through filters 5 to a spraying area 6 that contains a plurality of paint spray guns 7. As a workpiece, which for illustration purposes, is an automobile body 8, enters the spraying area 6, the paint spray guns 7 are activated to deliver paint to the body 8.

During this spraying process, paint that does not stick to the body 8 floats in the air as paint mist or overspray. With the assistance of an exhaust fan connected to the booth by exhaust duct 9, the flowing air and paint mist are directed from the spraying area 6, through a floor grating 10 and towards an inlet 11 of a wet scrubber 12, the details of which, according to the present invention, are further discussed below. Depending on the amount of air flow handled by the paint spray booth 1, the module of the paint spray booth 1 may include one or more wet scrubbers 12 with a common central inlet or individual inlets.

The under section 3 further includes an exhaust enclosure 13. Within the exhaust enclosure 13, the water and scrubbed air exit the wet scrubber 12 by way of a flow director or exhaust extension 14 that empties the water onto a floor 15 of the exhaust enclosure 13, which may be the floor of the under section 3. Ideally, the water containing the paint particles captured in the wet scrubber 12 flows out of an outlet 16 of the exhaust extension 14, along the floor 15 of the exhaust enclosure 13 and into a sluice 17. Preferably, the floor 15 of the exhaust enclosure 13 is sloped toward the sluice 17. From the sluice 17, the paint laden water 18 may be collected for treatment and recycling or disposal, as desired. The exhaust extension configuration described previously is substantially similar in operation and overall configuration to that of the scrubber described in U.S. Pat. No. 8,241,405 (B2), which is hereby expressly incorporated by reference.

Air exiting the outlet 16 of the exhaust extension 14 is routed toward an exhaust plenum 19 of the exhaust assembly 9, but may have a minimal amount of paint particles and water droplets suspended therein. To capture the residual water droplets and paint particles, en route to the exhaust plenum 19, the air proceeds through a plurality of baffles or mist eliminators 20 where the residual paint particles and water droplets are further collected. Finally, the air passes through the exhaust assembly 9 where it may be directed through a final exhaust filter or filter system (not shown) before it is discharged into the surrounding environment.

In one configuration of a wet scrubber 12, the inlet 11 of the wet scrubber 12 is mounted in a sealed manner to what is known as a flooded floor 21, which is a floor having a film or flow of water that is also directed to the inlet 11. In the described embodiment the inlet 11 is provided as a separate component and may be formed of sheet-metal which facilitates attachment to flooded floor 21 in a sealed manner. Moreover, forming the inlet 11 of metal provides enhanced protection against damage due to drop parts etc. within spraying area 6. Since the inlet 11 provides the only exit path for the paint laden air from the spraying area 6, a mixture of water from the flooded floor 21 and air entrained with paint particles enters the inlet 11 of the wet scrubber 12 together. As described below, in accordance with the present invention, the inlet 11 and a nozzle insert 24 are mounted in a sealed manner to the flooded floor 21 of a paint booth 1 and to the inlet of the scrubber so that the paint laden air from the spraying area 6 mixed with water from the flooded floor 21 enter the inlet 11 of the scrubber flowing through the nozzle insert 24 and exits from the bottom of the nozzle insert 24 into the wet scrubber 12.

Figure 2:
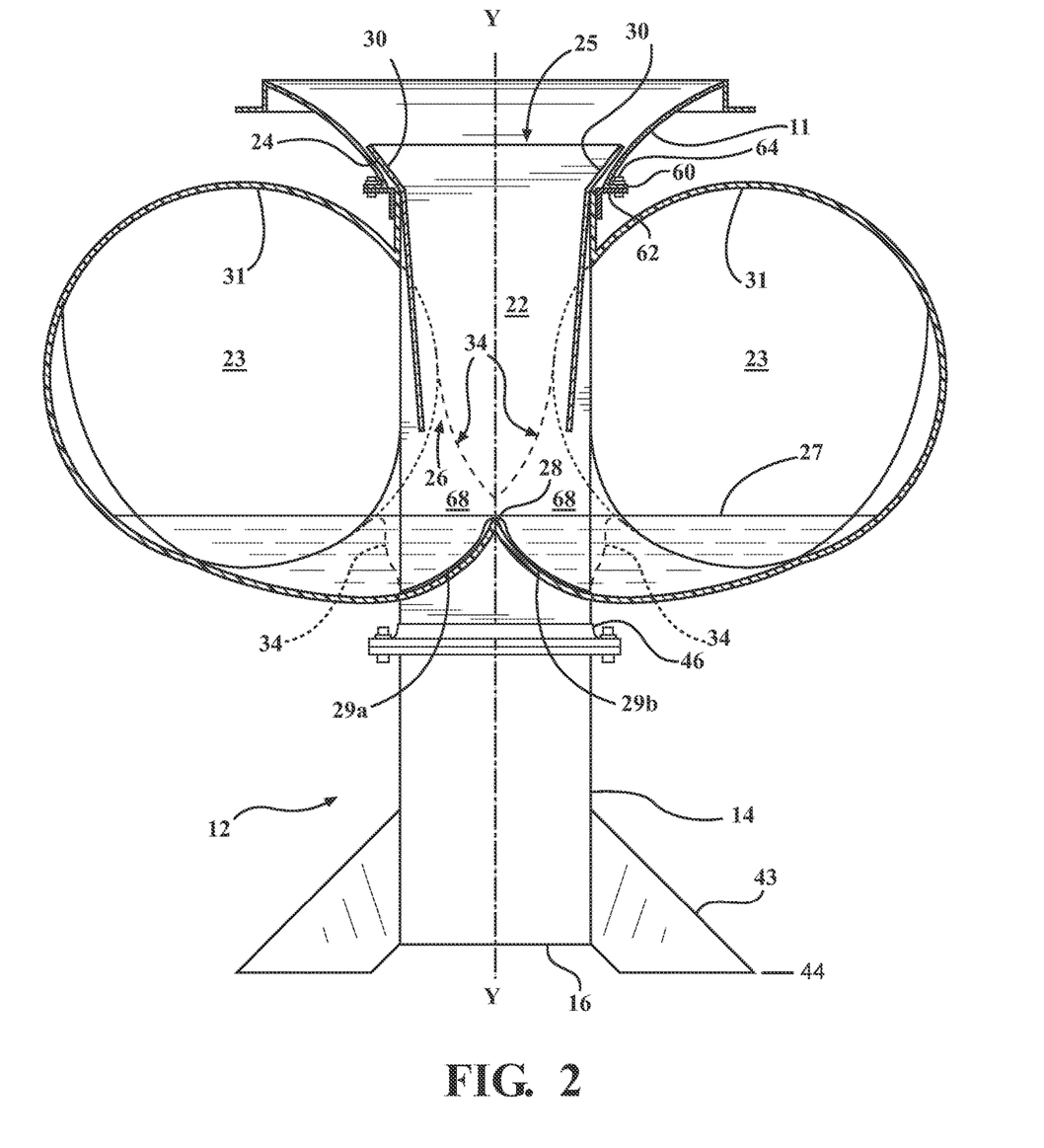
FIGS. 2 and 3 are schematic front and side views of a scrubber according to one embodiment of the present invention.
Figure 3:
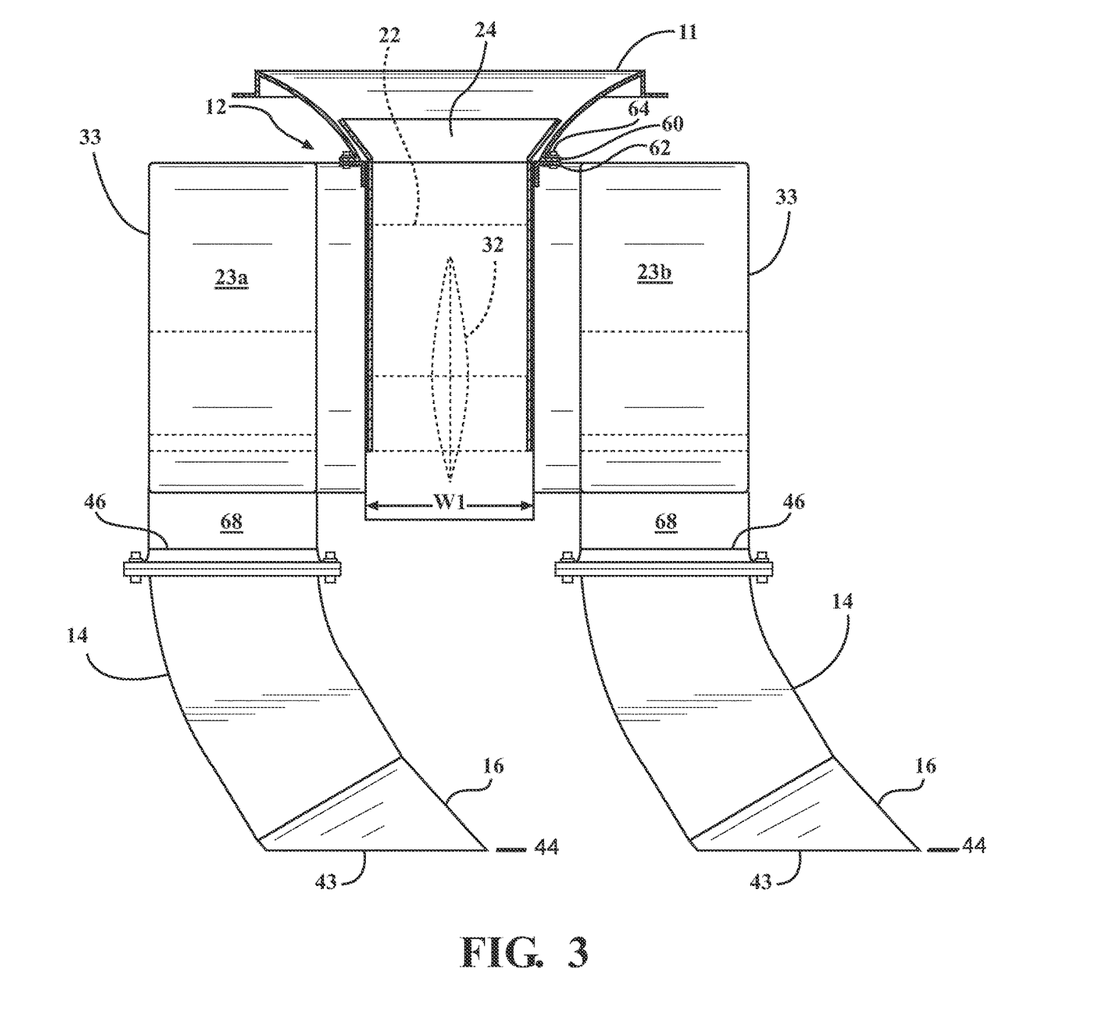

With reference to FIGS. 2 and 3, wet scrubber 12 forming one aspect of the present invention is formed of a body including an inlet 11, a mixing chamber 22, and a pair of vortex chambers 23, with the body connected with an exhaust extension 14. A nozzle insert 24 is a separate component placed into the inlet 11. The inlet 11 as depicted in FIGS. 2 and 3 has a substantially rectangular or square cross-section, it being understood that other cross-sectional configurations could be used.

The body of wet scrubber 12 is molded from a plastic material such as HDP or LDP as discussed above. A nozzle insert 24 is configured to be received in the inlet 11 of the wet scrubber 12. As discussed below the nozzle insert 24 is used to optimize the speed and mass flow rate of the air entrained with paint that enters the mixing chamber 22 of the wet scrubber 12.

Preferably, the nozzle insert 24 is positioned in substantially the center of the wet scrubber 12 to provide optimal delivery of air entrained with paint and water to the mixing chamber 22 and the vortex chamber 23. Proceeding from the inlet 11 to the outlet 26 of the nozzle insert 24, the nozzle insert 24 has a decreasing cross-sectional area. This change in dimension results in the speed of the air flow increasing as it proceeds through the nozzle insert 24. As discussed below, the sides of the nozzle insert 24 are angled inward from top to bottom at an angle or configuration that can optimize the speed of the air entrained with paint that exits the nozzle insert 24. The scrubber inlet 11 can be conveniently welded to structure of the flooded for floor 21. As mentioned above the nozzle inlet 11 and insert 24 are preferably formed of metal which is more conveniently attached by welding to other metal components and further is more damage resistant in the environment of the spray booth interior. When the nozzle insert 24 is inserted into the mixing chamber 22 it can be sealed against the interior surface of the inlet 11 by use of caulking, gaskets etc. One approach for attaching the inlet 11 to the main body of scrubber 12 is provided via attachment flanges 60 and 62 connected together via mechanical fasteners 64.

The mixing chamber 22 includes an impingement pool 27 positioned adjacent to the outlet 26 of the nozzle insert 24. Water flowing down the nozzle insert 24 is collected in the impingement pool 27. The air proceeding down the nozzle insert 24 strikes the water in the impingement pool 27, thereby mixing with the water. Because of the turbulence created by this mixing, some of the paint particles in the air become transferred to the water and stay suspended therein. Hence, the water serves to "trap" these particles.

To increase this turbulence and assist with substantially evenly diverting the air into the vortex chambers 23, the mixing chamber 22 includes a flow divider 28, which also provides stability to the flow inside the wet scrubber 12. As shown in FIG. 2, the flow divider 28 forms joined curved surfaces 29a, 29b of the impingement pool 27, such that the apex of the divider 28 substantially forms a line having a width W1 (see FIG. 3), which may be substantially equal to the width at the outlet 26. Accordingly, at least a portion of the air and water that exits the outlet 26 engages the divider 28 and/or the curved surfaces 29a, 29b. Ideally, the divider 28 substantially evenly divides the air, thus providing a similar amount of air to each vortex chamber 23. This helps to create a stable system which further increases efficiency and saves energy. Besides dividing the supply of air and water, the divider 28 causes further mixing of the air and water in the impingement pool 27, thereby increasing the mixing of these fluids and trapping more paint particles in the water.

The principle by which the flow divider 28 placed at the center of the impingement pool 27 may assist particulate capturing while pre-conditioning the mixture that enters the vortex chambers 23 is explained next. In a similar manner as described in U.S. Pat. No. 8,241,405 (B2), when entering the nozzle insert 24 through the inlet 11, water coming from a flooded floor 21 of a paint booth 1 runs as a film over the internal surfaces of walls 30 of the nozzle insert 24, while the paint laden air flows mainly through the center region of the nozzle insert 24. Due to acceleration of the air in the nozzle insert 24, the water film is broken into droplets that penetrate into the center region of the nozzle insert 24 where the air is flowing. However, it is possible that, at outlet 26, segregated regions containing air entrained with overspray and a partially broken water film would still exist at the central and peripheral regions of the flow, respectively. The divider 28 further enhances capturing by bisecting these segregated regions and reversing their relative locations. For example, after being acted upon by the divider 28, the region containing paint laden air enters the vortex chamber 23 at the peripheral region while the water film enters the vortex chamber 23 at the center region. Therefore, the paint laden air is "sandwiched" between the water film and the water contained at the bottom of the impingement pool 27 of the mixing chamber 22. Since water is roughly three orders of magnitude heavier than air, as soon as the sandwiched region enters the vortex chambers 23, the centrifugal force exerted squeezes the air and forces it through the water, hence, providing contact between the particles in the air and the water and, therefore, enhancing capturing.

The wet scrubber 12 includes two vortex chambers 23 symmetrically positioned about the line Y-Y. As shown, the vortex chambers 23 are substantially cylindrical, each having an inner wall surface 31. Upon entering the vortex chambers 23, the air and some of the water from the impingement pool 27 and/or the outlet 26, begin to circulate. Given the geometry of the vortex chambers 23, the air/water mixture rotates around the chamber, thereby forming vortices. These vortices cause heavier particles, such as paint particles and water droplets, to move toward the outer periphery of the vortex chambers 23 and displace smaller droplets toward the center of the vortex where they stay colliding with other small droplets until they are big enough to precipitate to the outer periphery of the vortex chambers 23. As these heavier particles contact one another, they join or coagulate to form bigger particles. Specifically, the centrifugal force on the air/water mixture propels large water droplets and paint particles toward the inner wall surface 31 of the vortex chambers 23, which is covered with a water film. As the paint particles collide with the water on this surface, they become trapped in the water.

With reference to FIG. 3, the vortex chambers 23 may include a projection or protrusion, such as a rib 32, projecting from the inner wall surface 31 of each vortex chamber 23. As shown, the rib 32 extends less than halfway around the periphery of each vortex chamber 23; however, the rib 32 may have a longer extension. Preferably, the rib 32 is attached approximately midway along the length of the vortex chamber 23 between end caps 33 of the vortex chambers 23. This results in the rib 32 dividing the vortex chamber 23 into substantially equal sized sub-chambers 23a, 23b. The rib 32 functions in a way similar to that of flow divider 28 by dividing the volume of air entering sub-chambers 23a, 23b equally, thereby further stabilizing the vortex and enhancing capturing. Due to the high speed circulation flow in the vortex chambers 23, the region at its center (the central vortex) has the lowest pressure. To reduce the pressure drop through the scrubber (that is, the difference between the pressure values at the inlet and outlet of the scrubber), this lowest pressure has to be returned to a higher pressure value at the exit, hence, recovering pressure energy. By conservation of energy, this pressure recovery process is achieved by smoothly decelerating the flow that exits the scrubber. This deceleration has to be done in such a way that no substantial recirculation appear at the outlet of the scrubber.

After the air/water mixture goes through the vortex chambers 23 it enters the diffuser 68. As shown in FIGS. 2 and 3, a plurality of diffusers 68 are positioned on the wet scrubber 12. Preferably, one diffuser 68 would be positioned at each end of each vortex chamber 23. The diffusers 68 include a plurality of curved surfaces 34 extending away from the vortex chamber 23. In other words, the surfaces 34 forming the diffuser 68 are curved in a opposite direction than the curvature of the vortex chambers 23. This difference in curvature helps to prevent the exhausted air from recirculating back into the vortex chambers 23, thereby resulting in a more efficient wet scrubber. Since the higher speed flow runs close to the peripheral regions of the vortex chamber 23, the opposite curvature helps decelerate the flow in that region to better equalize the speed of the flow exiting the scrubber 12.

FIGS. 2 and 3 illustrate a nozzle insert 24 according to one embodiment of the present invention. The design of the nozzle insert 24 of the present invention was developed as a way to provide structures that function similar to the adjustable plates 23a and 23b in U.S. Pat. No. 8,241,405 (B2). In the preferred manner of fabricating the body of the scrubber of the present invention out of plastic by a rotational molding process it was determined that structures similar to the adjustable plates 23a and 23b in U.S. Pat. No. 8,241,405 (B2) could not be readily produced by the rotational molding process. Further in the case of using HDP or LHP as the material or choice structural elements cannot be glued or welded to the internal walls of the plastic scrubber or otherwise attached in any acceptable manner.

In order to provide for adjustment of airflow in the plastic scrubbers of the present invention it was determined that nozzle insert 24 could be configured and used which replace the adjustable plates 23a and 23b in U.S. Pat. No. 8,241,405 (B2). Nozzle insert 24 may be formed of metal or another material.

Figure 4:
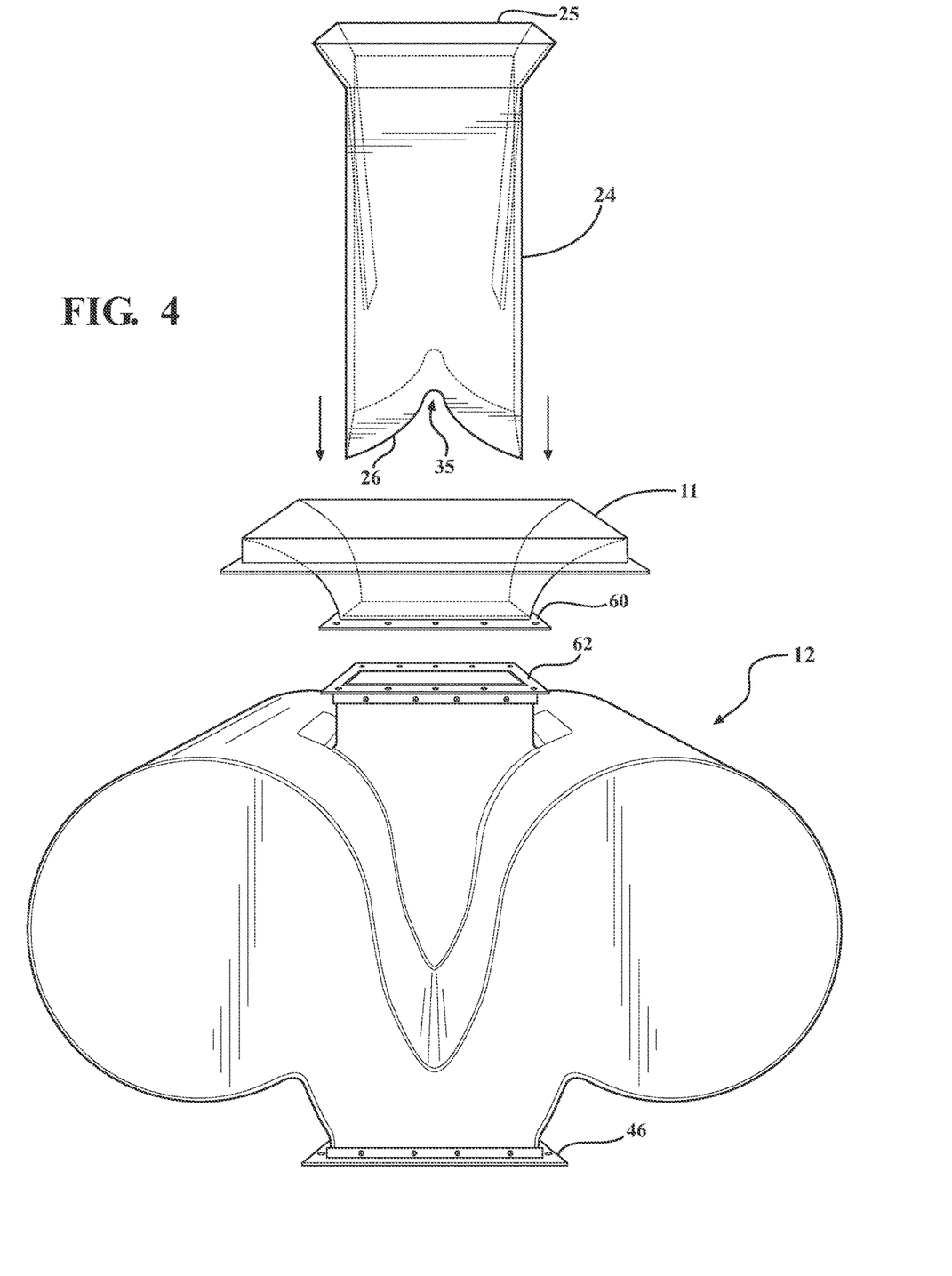
FIG. 4 is a schematic exploded view that depicts how a nozzle insert is received in an inlet and a scrubber according to the present invention.

FIG. 4 depicts the manner in which the nozzle insert 24 is received in the inlet 11 of the wet scrubber 12 and FIG. 2 depicts the nozzle insert 24 positioned in the wet scrubber 12. Proper alignment of the nozzle insert 24 in the wet scrubber 12 is achieved when the flow divider 28 (FIG. 2) is received in alignment notch 35 that is formed in the bottom of the front and rear walls of the nozzle insert 24.

Figure 5A:
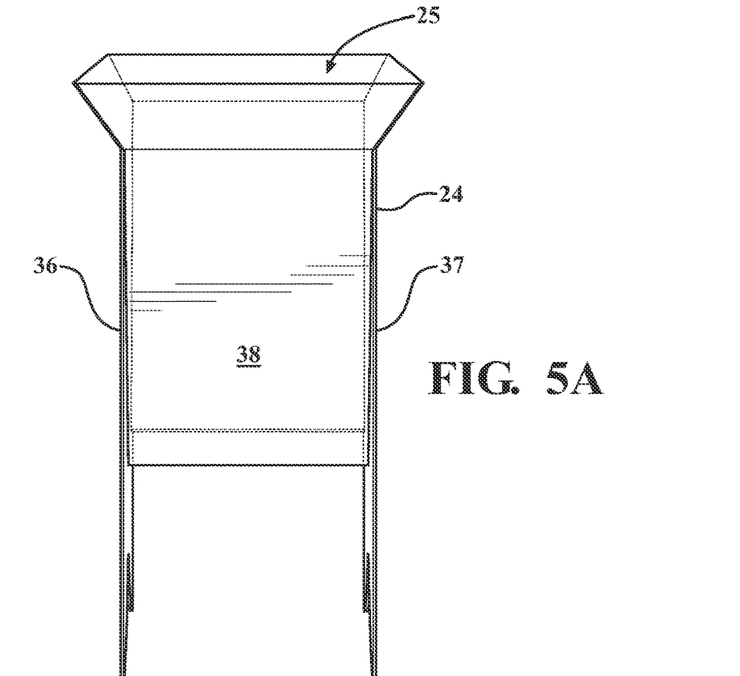
FIGS. 5A and 5B are schematic side and front views of a nozzle insert according to one embodiment of the present invention.
Figure 5B:
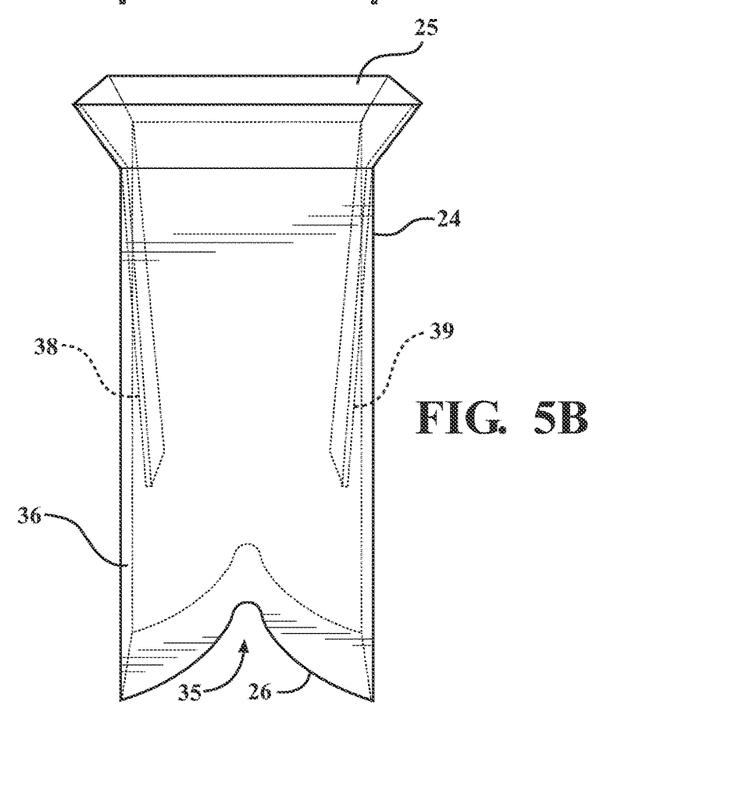

With reference to FIGS. 5A and 5B the nozzle insert 24 includes front and rear walls 36 and 37 that have alignment notches 35 formed centrally in the bottoms of the front and rear walls 36 and 37. As discussed above when the nozzle insert 24 is inserted into the inlet 11 of the wet scrubber 12 and lowered downward the flow divider 28 of the wet scrubber 12 is received in alignment notches 35 to assist in properly aligning the nozzle insert 24 in the wet scrubber 12. As depicted in FIGS. 5A and 5B the side walls 38 and 39 of the nozzle insert 24 taper or slant inward from the top to the bottom of the nozzle insert 24. As can be understood by those skilled in the art, the degree to which the side walls 38 and 39 taper or slant inwardly affects the speed of the air entrained with paint that exits the nozzle insert 24. According to the present invention, the adjustment of airflow for changes in operating conditions can be accomplished merely by providing nozzle insert 24 that is configured to produce different airflow characteristics and changing the nozzle insert 24 to accommodate or optimize operating conditions for a given system process. As can be understood, nozzle insert 24 of differing configurations can be exchanged by removing and installing each from the top of the scrubber 12. This operation can be easily performed from the upper section 2 without having to access under section 3 as in other scrubber designs. In the case of scrubber inlet 11 and the nozzle insert 24 being formed of metal, the inlet 11 can be directly welded or otherwise affixed to the flooded floor 21 which facilitates installation. In addition, by forming the scrubber inlet 11 and the nozzle insert 24 of metal enhanced durability is provided in the case that hard heavy objects are dropped or otherwise inserted into the inlet of the scrubber.

The insert inlet 25 at the top of the nozzle insert 24 has a funnel shape with an angle slightly larger than the local angle of the wall of the scrubber inlet 11. This configuration allows the insert inlet 25 of the nozzle scrubber insert 24 to sit flush and to seal against the internal surface of the scrubber inlet 11. As a result, the scrubbing liquid flowing down from the flooded floor 21 of a paint booth 1 enters the scrubber inlet 11 and continues toward the nozzle insert 24, avoiding flow from the inlet to bypass the nozzle insert 24. In one embodiment, the nozzle insert 24 is maintained in position by its own weight and by the pressure drop generated in the same nozzle insert 24. To further avoid leaking between the nozzle insert 24 and the scrubber inlet 11, the exterior edge of the nozzle insert 24 is provided with some caulking material. Of course, other means of maintaining the insert 24 in place and of avoiding leaks between the inlet 11 and the insert 24 are also possible. For example, the insert 24 could be held in place by using screws, pins, clips, etc. Also, leaks could be avoided by using gaskets, neoprene tape, or other sealing materials.

Figure 6A:
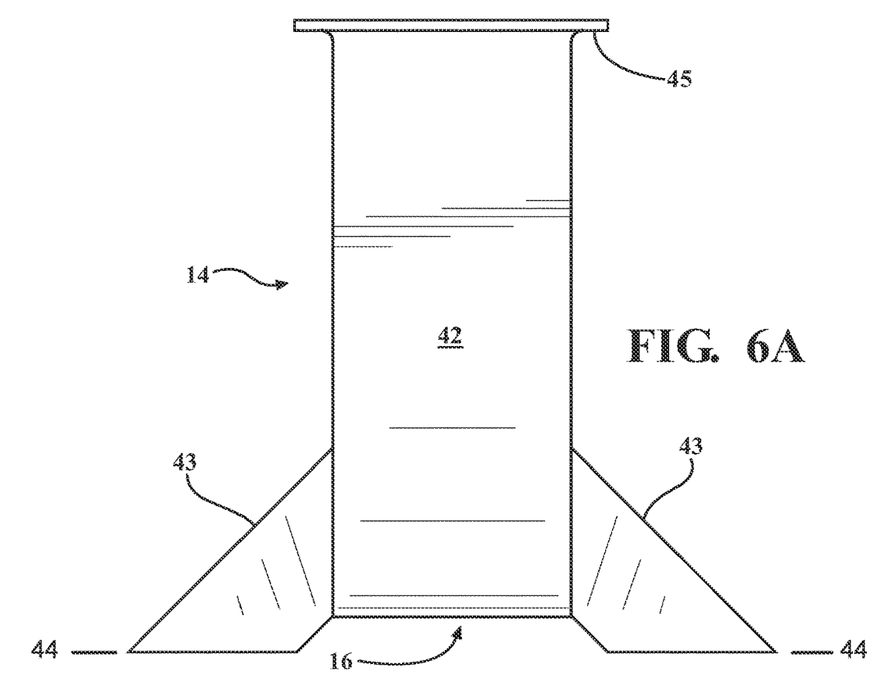
FIGS. 6A and 6B are schematic front and side views of an exhaust extension according to one embodiment of the present invention.
Figure 6B:
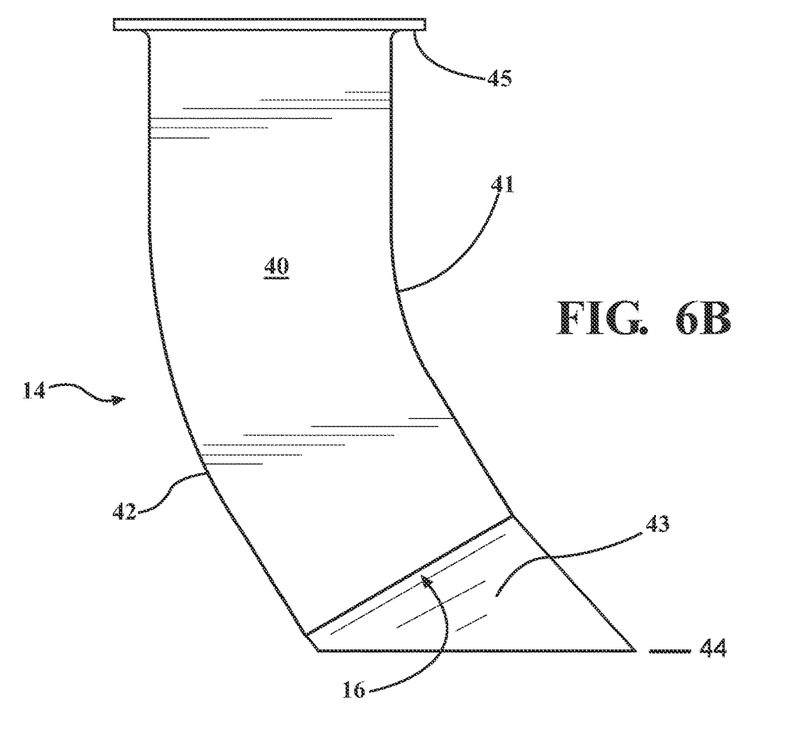
Figure 6C:
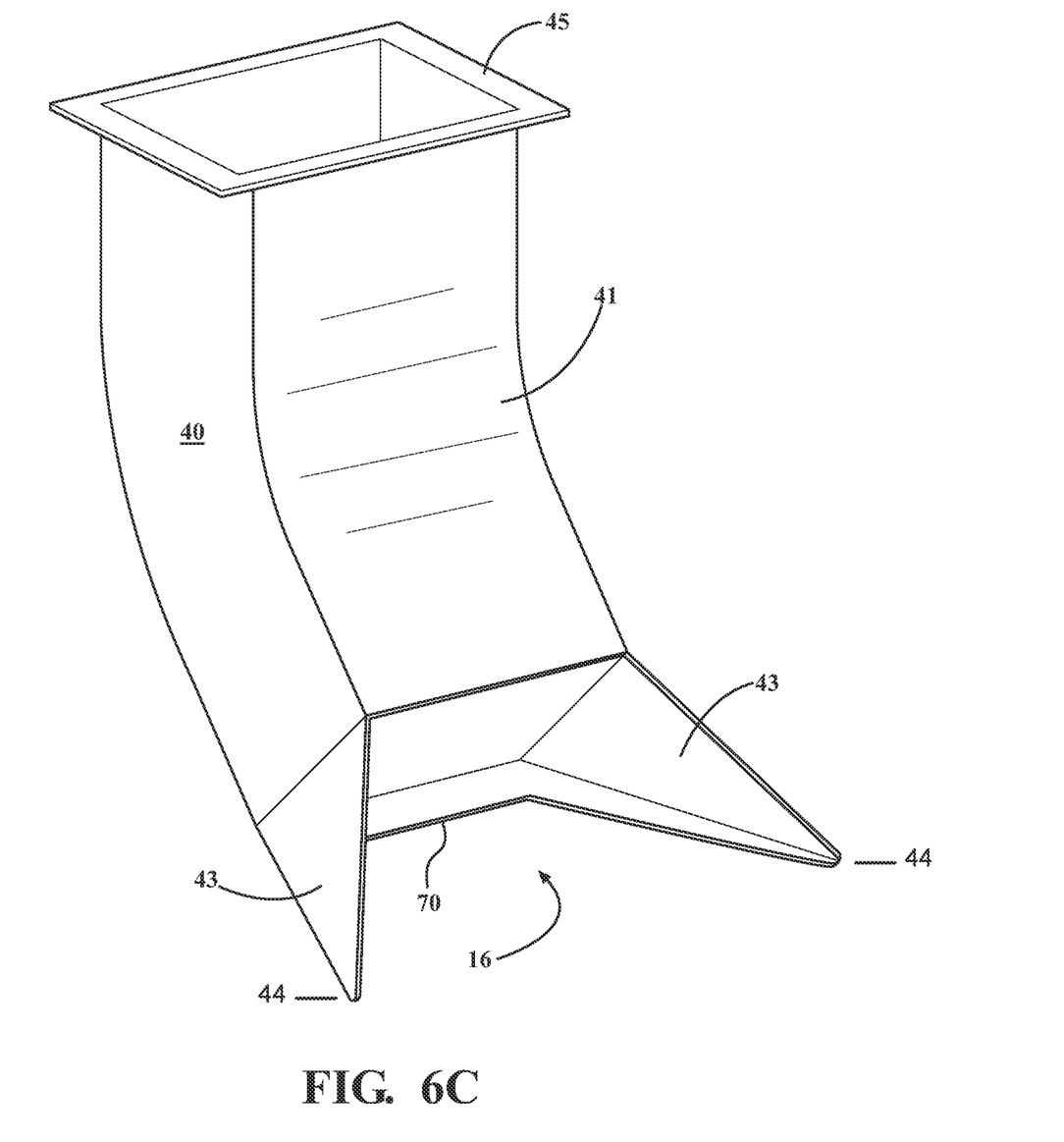
FIG. 6C is a pictorial view of an exhaust extension.

FIGS. 6A and 6B depict frontal and side views of an exhaust extension 14 according to one embodiment of the present invention. The illustrated exhaust extension is molded from a similar plastic material as that from which the wet scrubber 12 is molded. Here it is noted that during the course of the present invention it was determined that the use of plastic materials such as HDP or LDP prevent materials from sticking on the surfaces of the molded scrubber and exhaust extension, thus providing a self-cleaning function that reduces or eliminates periodic manual cleaning.

The general shape and function of the exhaust extension 14 is similar to that taught in U.S. Pat. No. 10,857,494 (B2) by the present inventor, the complete disclosure of which is hereby expressly incorporated by reference.

Exhaust extension 14 is provided in the form of a generally rectangular or square cross-section closed duct with side walls 40, a top wall 41 and a bottom wall 42. Attached to end of the exhaust extension 14 and located laterally adjacent to the sides of the outlet 16 is a pair of wings 43 which extend from the side walls 40. For simplicity and ease of fabrication, the wings 43 presented herein are flat and generally triangular in shape. The surface of the wings 43, however, need not necessarily be flat or triangular. Rather, in the direction proceeding from the outlet of the wet scrubber 12 toward a distal end or tip 44 of the wings 43, a curved shape may be employed. Specifically, partially circular, parabolic or other curved shapes could be used to efficiently provide a smooth and gradual deceleration of the flow of air out of the outlet 16. The depicted triangular shape of the wings 43 could also be varied. For example, the tips 44 of the wings 43 may be rounded or otherwise truncated to avoid sharp points or edges that could be encountered during handling, installation or maintenance of the wet scrubber 12. Additionally, the triangular shape of the wings 43 can be substituted with a rectangular shape, a rounded shape, a parabolic, etc. In each case, the wings 43 could be flat or curved (as previously discussed), all with the purpose of enhancing deceleration of the exhaust airflow and the further separation of any entrained water droplets. The outlet 16 of the exhaust extension 14 can be reinforced to prevent deformation created by the effect of airflow passing through the exhaust extension 14, bending by the action of weight when the exhaust extension 14 is stored sideways before installation, deformation when the plastic material of the flow extension 14 dries and/or softens in a harsh environment, etc. According to one embodiment, such reinforcement can be accomplished by providing or molding ribs 70 that surround the opening of the outlet 16 and/or ribs that extend across the opening of the outlet 16. Such reinforcement ribs can be molded or simply formed when cutting the outlet 16 into the plastic molded exhaust extension 14.

Figure 7:
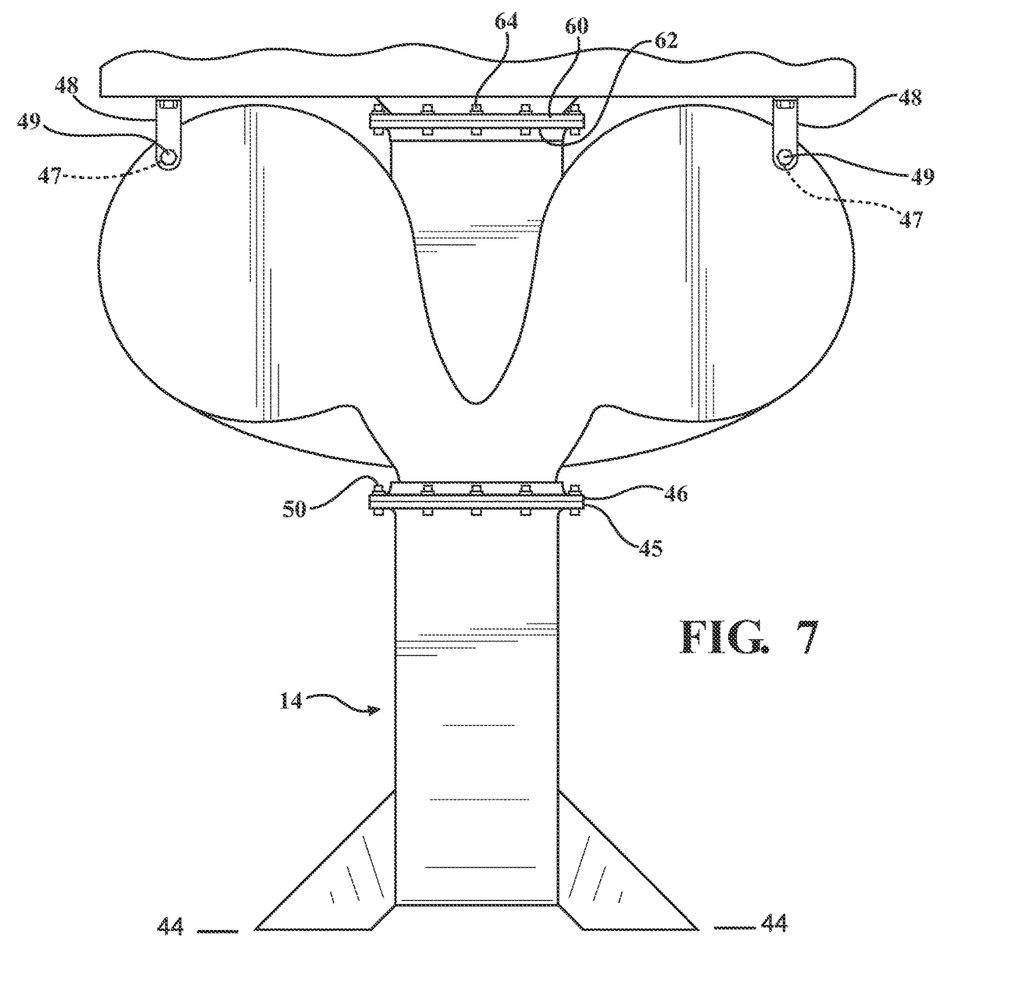
FIG. 7 is a schematic view that depicts the mounting arrangement of a scrubber according to one embodiment of the present invention.

A flange 45 is formed so as to extend outwardly around the inlet of the exhaust extension 14 as shown. A similar flange 46 is attached so as to extend outwardly around the outlet of the wet scrubber 12 as shown in FIG. 7. The inlet of the exhaust extension 14 is attached to the outlet of the main body of the scrubber 12 by placing a gasket (not shown) between the flanges 45 and 46 and securing the flanges 45 and 46 together by suitable mechanical fasteners 50 such as, clips, pins, threated elements such as bolts and nuts, etc.

As shown in FIG. 7 on the ends of the vortex chambers 23 can be provided with embedded fastener elements 47 that can be used to secure the wet scrubber 12 beneath a flooded floor or other structure of a processing system. Non-limiting examples of embedded fasteners include threaded screws, rods, bolts, nuts, pins, etc. In the embodiment shown in FIG. 7 the embedded elements 47 are internally threaded nuts and, as show in FIG. 7, the wet scrubber 12 is mounted to the illustrated overhead structure by means of brackets 48 that are secured to the embedded nuts 47 by threaded fasteners 49. The location of the embedded fasteners are according to convenience or to minimize any interference with the flow inside the wet scrubber 12.

The plastic molded scrubbers of the present invention are very light in weight. As compared to a wet vortex scrubber having a similar design, shape and size and fabricated from metal, a plastic molded scrubber according to the present invention may provide a weight reduction on the order of 85%. This difference in weight becomes very significant when workers have to install wet scrubbers in the limited space inside the under section 3 (see FIG. 1) of a paint booth which may be as small as only 4 feet high. Reduction of weight also reduces labor cost of installation and replacement. The plastic material of the scrubber acts as a thermal insulator reducing heat transfer and enhancing the performance of the dehumidification effect provided by operation of the scrubber.

While the design of the nozzle insert 24 described herein was driven by the inability to mold internal air adjustment plates in the plastic scrubbers of the present invention, the nozzle insert 24 can be used in metal wet scrubbers in place of typical or customary adjustment plates. An advantage associated with the use of the nozzle insert of the present invention is that they can be easily removed, replaced and exchanged from the top of a wet scrubber. In the case of fixed adjustment plates, they can be inadvertently contacted during cleaning or maintenance and go out of adjustment in which case they can only be accessed and manually readjusted from below.

The configuration of the nozzle insert 24 presented here is for illustration purposes. Other configurations and designs are possible to achieve the same objective of controlling the optimum speed inside the wet scrubber 12 (see FIG. 2) while providing the advantage of being accessed and replaced from the upper section 2 of spray booth 1 (see FIG. 1).

The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. A paint spray booth having a wet scrubber for scrubbing a fluid composed of air and entrained coating particles and for spraying an article with a coating,
the spray booth comprising an upper spraying section for positioning the article to be sprayed with the coating and an under section, the upper and under sections separated by a floor adapted for retaining a film of water, the wet scrubber positioned in the under section and receiving the water and the fluid from the upper section,
the wet scrubber comprising;
a scrubber inlet formed of metal and affixed to the spray booth floor,
a body forming a body inlet in communication with the scrubber inlet, which is rectangular in cross-section and a mixing chamber, at least one vortex chamber and at least one body outlet, the body composed of a plastic material; and
a nozzle insert formed of metal and removably received in the body inlet and inserted into the scrubber inlet, the scrubber inlet and the nozzle insert receiving the water and the fluid from the upper section and directing the water and the fluid into the mixing chamber and the at least one vortex chamber, the nozzle insert is rectangular in cross-section and forming an insert inlet, an insert outlet, opposed front and rear walls, and a pair of opposed side walls, wherein the opposed side walls are shorter in length than the opposed front and rear walls, further comprising the nozzle insert front and rear walls form a complementary shaped structure that engages the scrubber body to position the nozzle insert in the wet scrubber body.

2. The wet scrubber in according to claim 1, further comprising the nozzle insert is formed of sheet-metal.

3. The wet scrubber according to claim 1, further comprising the scrubber inlet formed of sheet-metal.

4. The wet scrubber in according to claim 1, further comprising the plastic material is a polyethylene.

5. The wet scrubber according to claim 1, further comprising at least one exhaust extension in communication with the at least one body outlet formed as a separate component from the body and affixed to the at least one body outlet for exhausting a treated fluid from the wet scrubber.

6. The wet scrubber according to claim 5, further comprising the exhaust extension consists of a plastic material.

7. The wet scrubber in according to claim 6, further comprising the plastic material is a polyethylene.

8. The wet scrubber according to claim 5, further comprising the exhaust extension has a rectangular cross-section with extension side walls, an extension top wall and an extension bottom wall.

9. The wet scrubber according to claim 1, further comprising the scrubber body mixing chamber forming an impingement pool retaining a volume of water adjacent to the insert outlet.

10. The wet scrubber according to claim 9, further comprising the mixing chamber forming a low divider directing the flow of the fluid flowing from the inlet into a pair of the vortex chambers positioned laterally from the mixing chamber and the insert complementary structure engaging the flow divider.

11. The wet scrubber according to claim 10, further comprising the pair of vortex chambers are cylindrical.

12. The wet scrubber according to claim 10, further comprising the vortex chambers include a projection projecting from an inner wall surface of each of the vortex chambers, the projections dividing each of the vortex chambers into equal sized sub-chambers.

13. The wet scrubber according to claim 1, further comprising the opposed side walls of the insert taper inwardly from the insert inlet toward the insert outlet so as to increase the speed of a flow of the fluid through the nozzle insert.

* * * * *